(12) United States Patent
Shang et al.

(10) Patent No.: US 7,831,252 B2
(45) Date of Patent: Nov. 9, 2010

(54) METHOD, USER EQUIPMENT AND NETWORK FOR PERFORMING A HANDOVER FOR USER EQUIPMENTS IN PEER-TO-PEER COMMUNICATION MODE, TO A CELL WHOSE LINK PERFORMANCE IS A PREDEFINED VALUE HIGHER THAN THAT OF THE ACTIVE CELL

(75) Inventors: Dan Shang, Shanghai (CN); Li Sun, Shanghai (CN)

(73) Assignee: ST-Ericsson SA, Geneva (CH)

( * ) Notice: Subject to any disclaimer, the term of this patent is extended or adjusted under 35 U.S.C. 154(b) by 524 days.

(21) Appl. No.: 10/580,729

(22) PCT Filed: Nov. 9, 2004

(86) PCT No.: PCT/IB2004/052344

§ 371 (c)(1),
(2), (4) Date: May 24, 2006

(87) PCT Pub. No.: WO2005/053346

PCT Pub. Date: Jun. 9, 2005

(65) Prior Publication Data

US 2007/0115884 A1    May 24, 2007

(30) Foreign Application Priority Data

Nov. 27, 2003    (CN) .......................... 2003 1 0118645

(51) Int. Cl.
*H04W 36/00* (2009.01)
(52) U.S. Cl. .................. 455/436; 370/331; 370/332
(58) Field of Classification Search .......... 455/437, 455/436, 439, 442, 450, 522, 562; 370/328, 370/331, 332, 335, 338, 342; 375/285, 346
See application file for complete search history.

(56) References Cited

U.S. PATENT DOCUMENTS 6,415,146 B1    7/2002    Capece (Continued)

FOREIGN PATENT DOCUMENTS

CN    1133669 A    10/1996

(Continued)

OTHER PUBLICATIONS

International Search Report dated Feb. 16, 2005 in connection with PCT Application No. PCT/IB2004/052344.

(Continued)

*Primary Examiner*—Kamran Afshar
*Assistant Examiner*—Babar Sarwar

(57) ABSTRACT

A method to be executed by a UE (user equipment) is proposed, for said UE in P2P communication mode to perform cell handover, comprising steps of: detecting downlink signals of the active cell in which said UE is camping and its adjacent cells (S205); judging whether there exists a suitable cell whose link performance is a predefined value higher than that of said active cell (S209), according to the detecting result; sending a detection report message to a network system (S210) to start a judging procedure of said network system if there exists said suitable cell, and said judging procedure deciding whether said UE and another UE in P2P communication can handover into said suitable cell to continue P2P communication.

20 Claims, 5 Drawing Sheets

U.S. PATENT DOCUMENTS

| | | | |
|---|---|---|---|
| 6,546,058 B1 * | 4/2003 | Gilhousen et al. | 375/285 |
| 6,574,266 B1 * | 6/2003 | Haartsen | 375/133 |
| 6,744,750 B1 * | 6/2004 | Berger | 370/337 |
| 6,957,069 B2 * | 10/2005 | Shah et al. | 455/436 |
| 7,079,509 B2 * | 7/2006 | Belcea | 370/330 |
| 7,082,108 B2 * | 7/2006 | Hwang et al. | 370/311 |
| 7,400,894 B2 * | 7/2008 | Ebner et al. | 455/502 |
| 7,444,170 B2 * | 10/2008 | Karabinis | 455/562.1 |
| 7,492,773 B2 * | 2/2009 | Hester et al. | 370/401 |
| 7,684,813 B2 * | 3/2010 | Benson et al. | 455/517 |
| 2001/0036810 A1 * | 11/2001 | Larsen | 455/11.1 |
| 2002/0151320 A1 * | 10/2002 | Wasenius | 455/518 |
| 2003/0013471 A1 * | 1/2003 | Vilmur et al. | 455/513 |
| 2003/0144003 A1 * | 7/2003 | Ranta et al. | 455/450 |

FOREIGN PATENT DOCUMENTS

| | | |
|---|---|---|
| CN | 1404700 A | 3/2003 |
| GB | 2 336 070 A | 10/1999 |
| WO | WO 95/12297 A1 | 5/1995 |
| WO | WO 01/62026 A1 | 8/2001 |
| WO | WO 2004/077920 | 9/2004 |
| WO | WO 2004/080103 | 9/2004 |
| WO | WO 2004/103008 | 11/2004 |

OTHER PUBLICATIONS

Written Opinion of the International Searching Authority dated May 27, 2006 in connection with PCT Application No. PCT/IB2004/052344.

* cited by examiner

METHOD, USER EQUIPMENT AND NETWORK FOR PERFORMING A HANDOVER FOR USER EQUIPMENTS IN PEER-TO-PEER COMMUNICATION MODE, TO A CELL WHOSE LINK PERFORMANCE IS A PREDEFINED VALUE HIGHER THAN THAT OF THE ACTIVE CELL

CROSS-REFERENCE TO RELATED APPLICATION(S)

The present application claims priority under 35 U.S.C. §365 to International Patent Application No. PCT/IB2004/052344 filed Nov. 9, 2004, entitled "METHOD, USER EQUIPMENT AND NETWORK FOR PERFORMING A HANDOVER FOR USER EQUIPMENTS IN PEER-TO-PEER COMMUNICATION MODE, TO A CELL WHOSE LINK PERFORMANCE IS A PREDEFINED VALUE HIGHER THAN THAT OF THE ACTIVE CELL". International Patent Application No. PCT/IB2004/052344 claims priority under 35 U.S.C. §365 and/or 35 U.S.C. §119(a) to Chinese Patent Application No. 200310118645.7 filed Nov. 27, 2003 and which are incorporated herein by reference into the present disclosure as if fully set forth herein.

FIELD OF THE INVENTION

The present invention relates generally to a P2P communication method in wireless communication networks, and more particularly, to method for UEs in P2P communication mode to handover.

BACKGROUND OF THE INVENTION

In conventional cellular mobile communication systems, a UE (user equipment) has to communicate with the other UE only through the relaying of base stations regardless of the distance between the two UEs. FIG. 1 illustrates this conventional communication mode, where UE1 and UE2 exchange information through the UTRAN consisting of the base station transceiver (namely Node B) and the RNC, and this communication mode is also called UP-UTRAN-DOWN mode. However, in some case s when the distance between two UEs in the same cell is very close, it can be a more reasonable way for them to communicate directly, rather than through the relaying of base stations. This method is the so-called peer-to-peer communication, abbr. as P2P.

FIG. 2 illustrates a P2P communication mode. As FIG. 2 shows, where the dashed line represents signaling link, the solid line represents data link and the arrowhead represents direction of information flow. Only signaling link exists between the UTRAN and the UE, while only data link exists between the two communicating UEs. Assume that only resource for maintaining basic communication is needed. If a direct link is taken as one unit of radio resource (with fixed frequency, timeslot and spreading code), it can be easily drawn that P2P communication mode only needs two units of radio resource to maintain basic communication. If additional signaling cost for management is ignored, P2P communication can save about 50% radio resource than conventional communication mode. Meanwhile, the UTRAN still holds control over P2P communication, especially over how to use radio resources, so that network operators can easily charge for the radio resource used in P2P communication.

It is commonly accepted that a Time Division Duplex (TDD) air interface is a communication standard that offers a more flexible adaptation to different uplink and downlink traffic requirements. Among existing 3G systems based on TDD communication mode, TD-SCDMA (Time Division—Synchronization Code Division Multiple Access) system is an ideal communication system to be the most suitable for the combination of P2P communication with conventional communication mode, because the same carrier frequency is applied in both uplink and downlink communications, which can simplify the RF (Radio Frequency) module of the mobile terminal.

A method and apparatus for establishing P2P communication in wireless communication networks, as described in the patent application entitled "A Method and Apparatus for Establishing P2P Communication in Wireless Communication Networks", filed by KONINKLIJKE PHILIPS ELECTRONICS N.V. on Mar. 7, 2003, with the application Ser. No. 03119892.9, is suitable to any TDD CDMA communication system including TD-SCDMA systems, and incorporated herein as reference.

A method and apparatus for radio link establishment and maintenance with P2P communication in wireless communication networks, as described in the patent application entitled "A Method and Apparatus for Radio Link Establishment and Maintenance with P2P Communication in Wireless Communication Networks", filed by KONINKLIJKE PHILIPS ELECTRONICS N.V. on Mar. 7, 2003, with the application Ser. No. 03119895.3, is suitable to any wireless communication system including TD-SCDMA systems, and incorporated herein by reference.

After establishing uplink synchronization with the UTRAN through the same random access procedure as existing TD-SCDMA systems, the UE can establish a P2P direct link with the other UE, in accordance with the method and apparatus as described in the patent application document whose application Ser. No. is 03119892.9, i.e.: allocate relevant dedicated resource for two P2P UEs. Then, direct link between the two UEs can be established and maintained in accordance with the method and apparatus as described in the patent application document whose application Ser. No. is 03119895.3, so that the two UEs can receive and transmit P2P signals in the allocated timeslots respectively, and thus P2P communication between two UEs can be achieved.

However, in P2P communication mode, the P2P link between the involved UEs or the signaling link between the UE and UTRAN may deteriorate because of the communication environment changing or the movement of the UEs. So a UE in P2P communication mode (abbr. as P2P UE later) has to switch from P2P mode to continue communication in conventional UP-UTRAN-DOWN mode when the P2P link and the signaling link can't satisfy the QoS requirement. A detailed description is offered to the method for switching from P2P communication mode to conventional communication mode, as described in the patent application entitled "A Method and Apparatus for Soft-Switching between P2P Communication Mode and Conventional Communication Mode in Wireless Communication Systems", filed by KONINKLIJKE PHILIPS ELECTRONICS N.V. on May 19, 2003, with the application Ser. No. as 03123742.8, and incorporated herein as reference.

According to the technical details as disclosed in the above application document, when one or two P2P UEs move to the border of the cell where they camp (the active cell), the signaling link between the UE and the base station (Node B) can't maintain normal P2P communication, so the UEs will first switch from current P2P communication mode to conventional communication mode, and then handover to an adjacent cell that can satisfy the QoS requirement, by using the cell handover method in conventional mode, and continue to communicate in conventional mode.

According to the technical solution of the application document, two UEs can continue communication without being noticed by subscribers, but P2P communication has a remarkable advantage of saving network resource. Hence, when cell handover is needed for P2P UEs, it would be a more reasonable communication mode option that the two UEs to continue P2P communication if they still can satisfy the requirement for P2P communication.

SUMMARY OF THE INVENTION

An object of the present invention is to provide a cell handover method for P2P (Peer-to-Peer) UEs. With this method and apparatus, two UEs can maintain P2P communication when they handover from the active cell to an adjacent cell, if they still can satisfy the requirement for P2P communication.

A method for the P2P UE to perform cell handover according to the present invention, performed by a UE (user equipment), comprises: measuring downlink signals of the active cell on which the UE is camping and its adjacent cells; judging whether there exists a suitable cell whose link performance is a predefined value higher than that of the active cell, according to the measurement result; sending a measurement report message to a network system to start a judging procedure of the network system if there exists the suitable cell, and the judging procedure is for deciding whether the UE and the other P2P UE can handover into the suitable cell to continue P2P communication.

A method for two P2P UEs to perform cell handover according to the present invention, performed by a network system, comprises: receiving a measurement report message from any one of the two UEs, indicating that the UE detects there exists a suitable cell in the adjacent cells of its active cell, and the link performance of the suitable cell is a predefined value higher than that of its active cell; starting a judging procedure to decide whether the two UEs can handover into the suitable cell to continue P2P communication, including whether the link performance of the other UE in the suitable cell satisfies the QoS requirement; establishing signaling link between the two UEs if the QoS requirement can be satisfied; sending a handover command to the two UEs, so that the two UEs can establish P2P connection in the suitable cell.

BRIEF DESCRIPTION OF THE DRAWINGS

For a detailed description of the p referred embodiments of the invention, reference will now be made to the accompanying drawings in which.

DETAILED DESCRIPTION OF THE INVENTION

A detailed description is given below to the present invention, taking TD-SCDMA system as an example. To understand the cell handover method for P2P UEs in the present invention, a brief introduction will be given first to the cell handover procedure in conventional mode to be executed by the UE and the UTRAN, in conjunction with FIG. 3.

Figure 1:
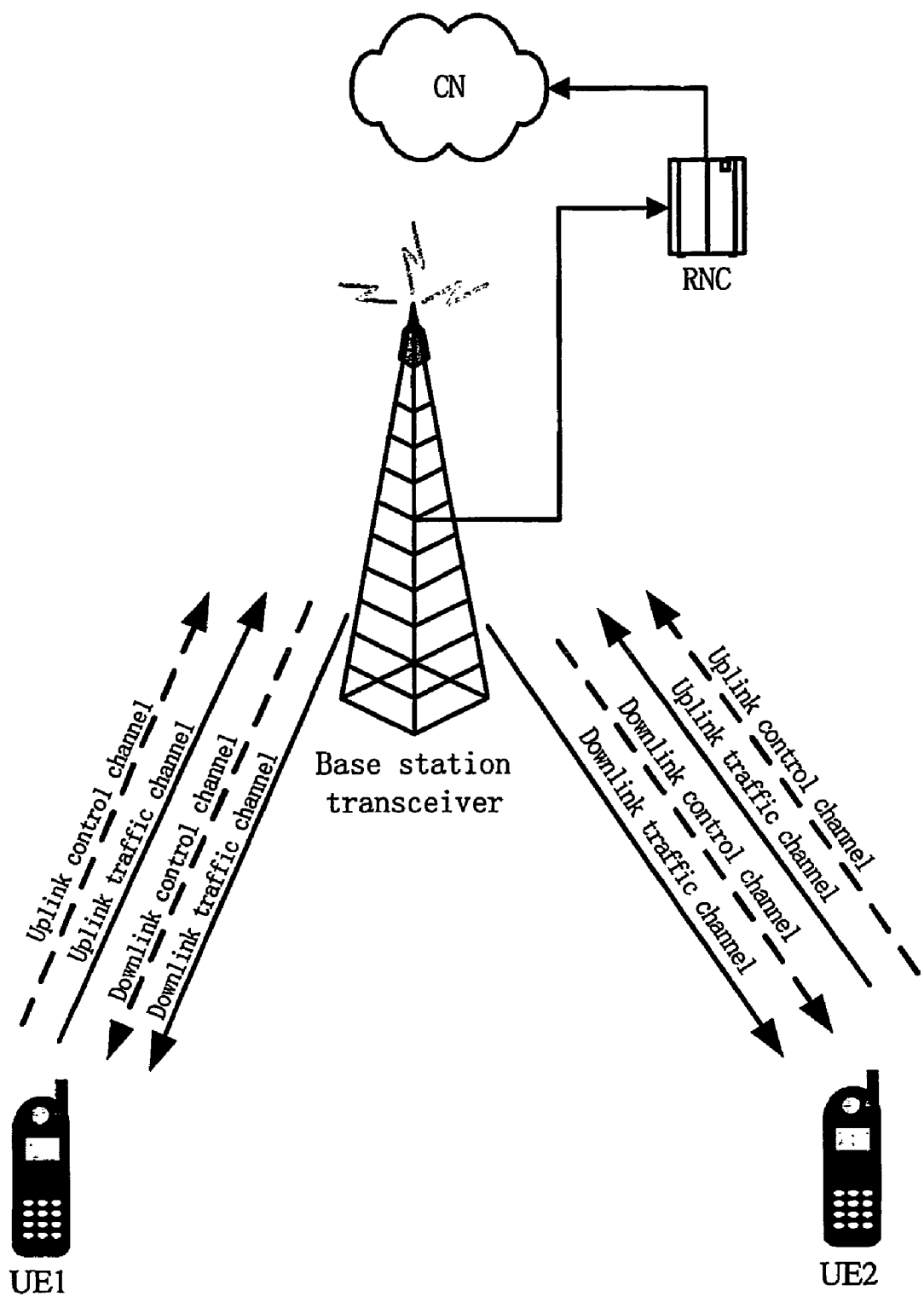
FIG. 1 is a schematic diagram illustrating two UEs communicate through the relaying of base stations in conventional communication mode.
Figure 2:
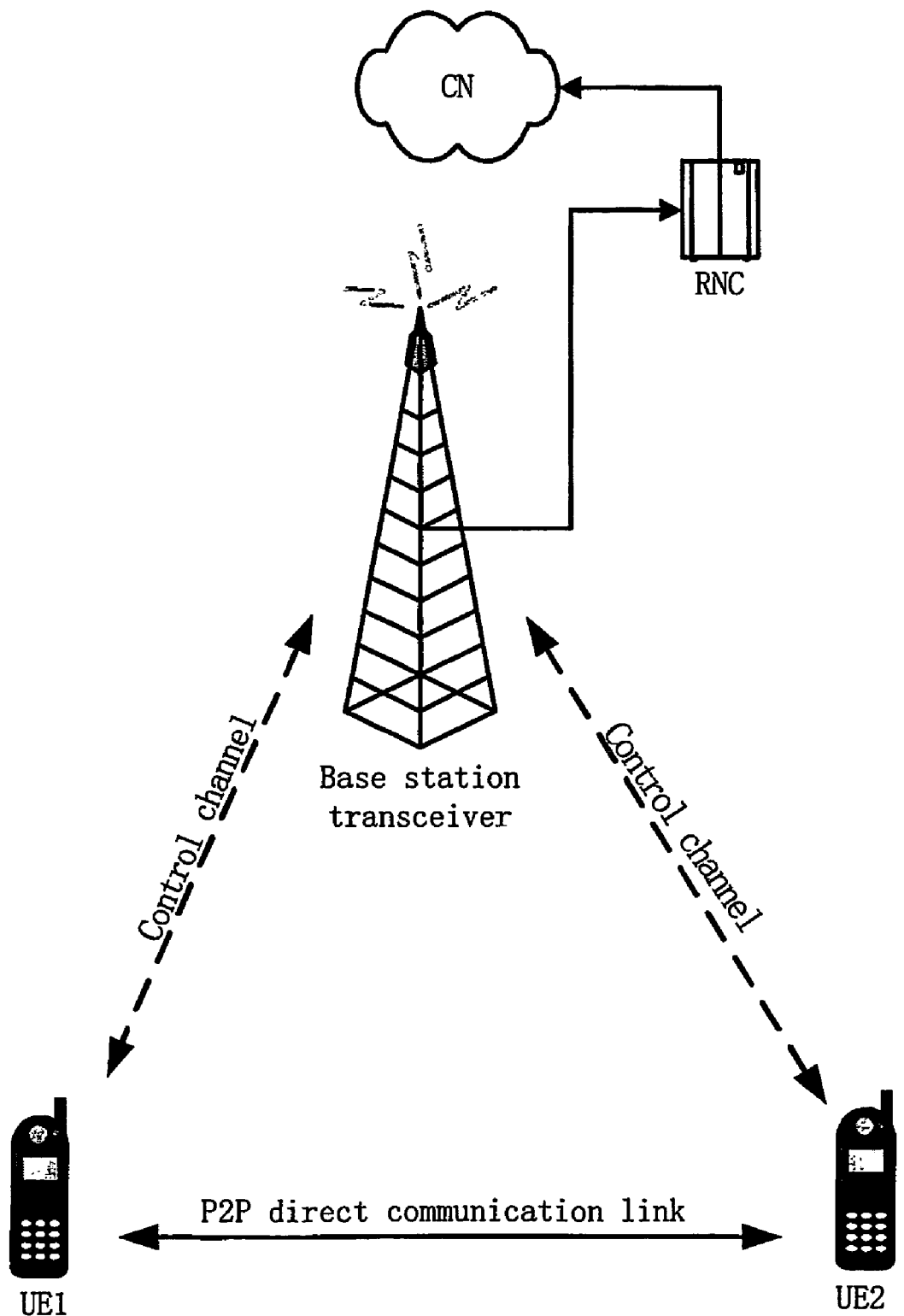
FIG. 2 is a schematic diagram illustrating two UEs communicate in P2P communication mode.
Figure 3:
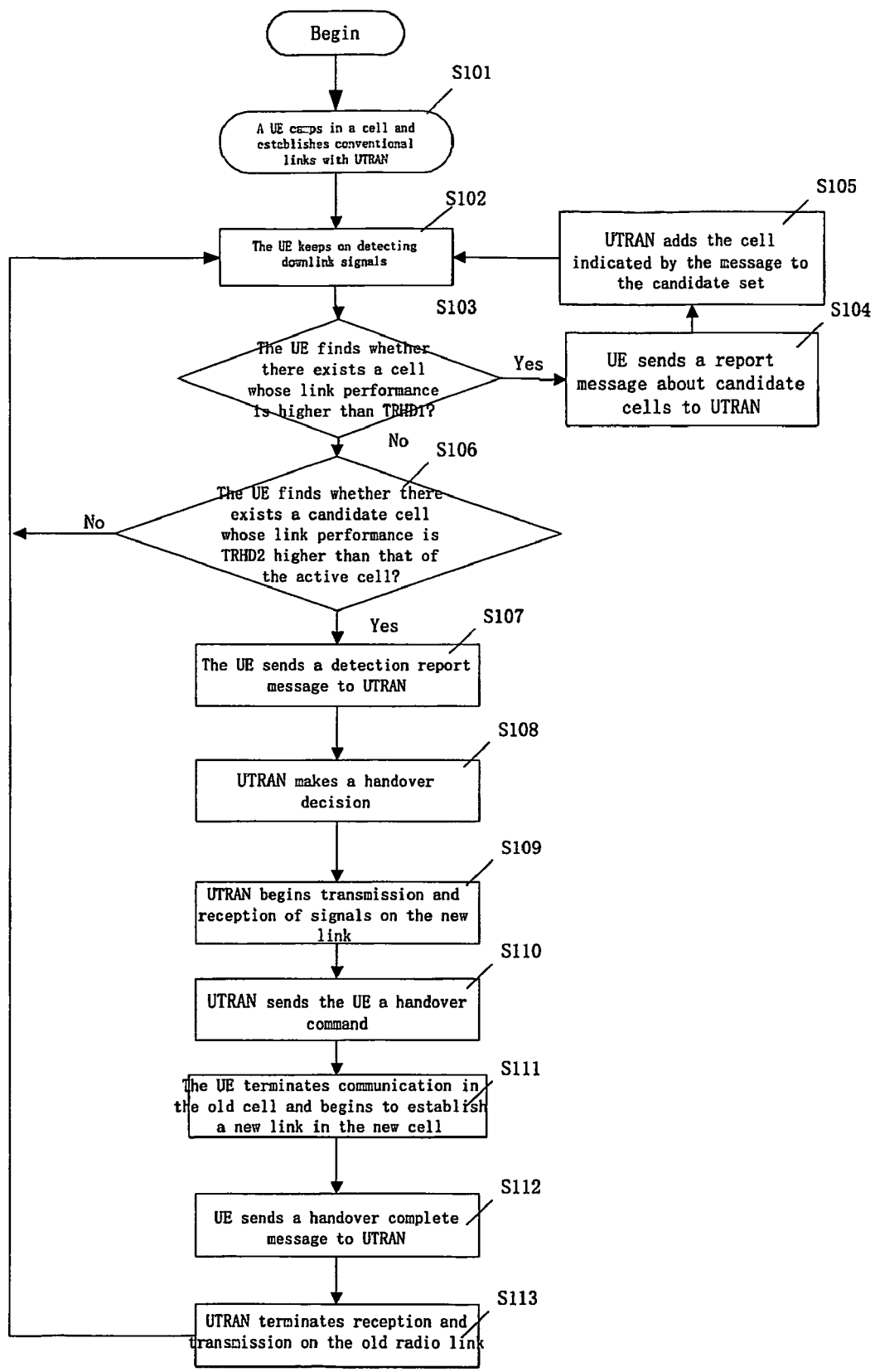
FIG. 3 is a schematic diagram illustrating the cell handover procedure to be executed by the UE and the UTRAN when cell handover is performed in conventional way.

As FIG. 3 shows, a UE first selects a cell to camp on via cell search procedure when powering on, which is the same as conventional communication mode. Then, it will establish a radio link with the network system (namely the UTRAN) to enable conventional communication, via random access procedure (step S101).

After establishing a link with the UTRAN, the UE receives the measurement control message (including measurement content, report (上报) standard, report format and etc) from the UTRAN, and keeps on measuring downlink signals of the cells (such as the active cell where the UE camps and its adjacent cells) indicated in the measurement control message (step 102). For example, the UE measures P-CCPCH RSCP (the Primary Common Control Channel Received Signal Code Power), to obtain the downlink Rex power of the active cell where the UE camps and its adjacent cells.

During the measurement procedure, if the UE finds an adjacent cell whose downlink performance is higher than a predefined threshold TRHD1 (step S103), the UE sends a candidate cell report message to the UTRAN, reporting the adjacent cell as a candidate cell to the UTRAN (step S104). Wherein, the downlink performance can be the UE's BER (Bit Error Rate) criterion, TRHD1 is a lower limit value at which the link performance between the UE and the UTRAN can satisfy the QoS requirement, and the candidate cell is a cell that is not active yet but its link performance can satisfy the QoS requirement when its link is used for receiving and transmitting signals.

On receipt of the candidate cell report message from the UE, the UTRAN adds the cell indicated in the report message into the UE's candidate cell set (step S105). Herein it's assumed that the storage area for storing the candidate cell set is large enough, so, whenever the UE finds a new candidate cell and sends a report message to the UTRAN, the UTRAN can add the new candidate cell into the UE's candidate cell set.

When the UE measures the downlinks of the cell indicated in the above measurement control message one by one but still fails to find a new candidate cell, it will check whether there exists a suitable candidate cell in the UE's candidate cell set, wherein the link performance of the candidate cell is a predefined threshold TRHD2 higher than that of the active cell (step S106).

If such suitable candidate cell exists, the UE sends a measurement report message to the UTRAN, to start the UTRAN's cell handover operations (step S107). After receiving the measurement report message from the UE, the UTRAN makes a handover decision according to the radio resource allocation (step S108).

Assume that the UTRAN can always satisfy the UE's request for radio resource, the UTRAN activates the link in the candidate cell, and receives and transmits control signals for establishing a new link in the handover cell via the link in the handover cell (step S109). The UTRAN sends a handover command to the UE via the link in former active cell (step S110). On receipt of the handover command, the UE ends the communication in former cell, and establishes a new link in the new cell according to the radio resource information included in the handover command (step S111).

After establishing a link in the handover cell successfully, the UE sends a handover success message to the UTRAN (step S112). On receipt of the handover success message, the UTRAN stops signals reception and transmission over the link in the former cell, and releases the radio resource occupied by the former cell (step S113).

The cell handover procedure by the UE and the UTRAN in conventional mode is described as above. In P2P communication mode, signaling signal takes place between the UE and the UTRAN, while traffic signals are flowing between two P2P communicating UEs. Accordingly, when one of the two P2P communicating UEs or two move to the border of a cell, if handover to another cell is needed, the handover operations will directly involve the two UEs. Considering whether to handover the two UEs to another cell simultaneously and continue P2P communication, or maintain the P2P communication between the two UEs in current active cell, or handover the two UEs into conventional mode so that their communication won't be broken down, handover in P2P communication mode shows difference from the above handover in conventional communication mode.

A description will be given below to the cell handover procedure to be executed between the UE and the UTRAN when a P2P UE performs cell handover in accordance with the present invention, in conjunction with FIG. 4.

Figure 4:
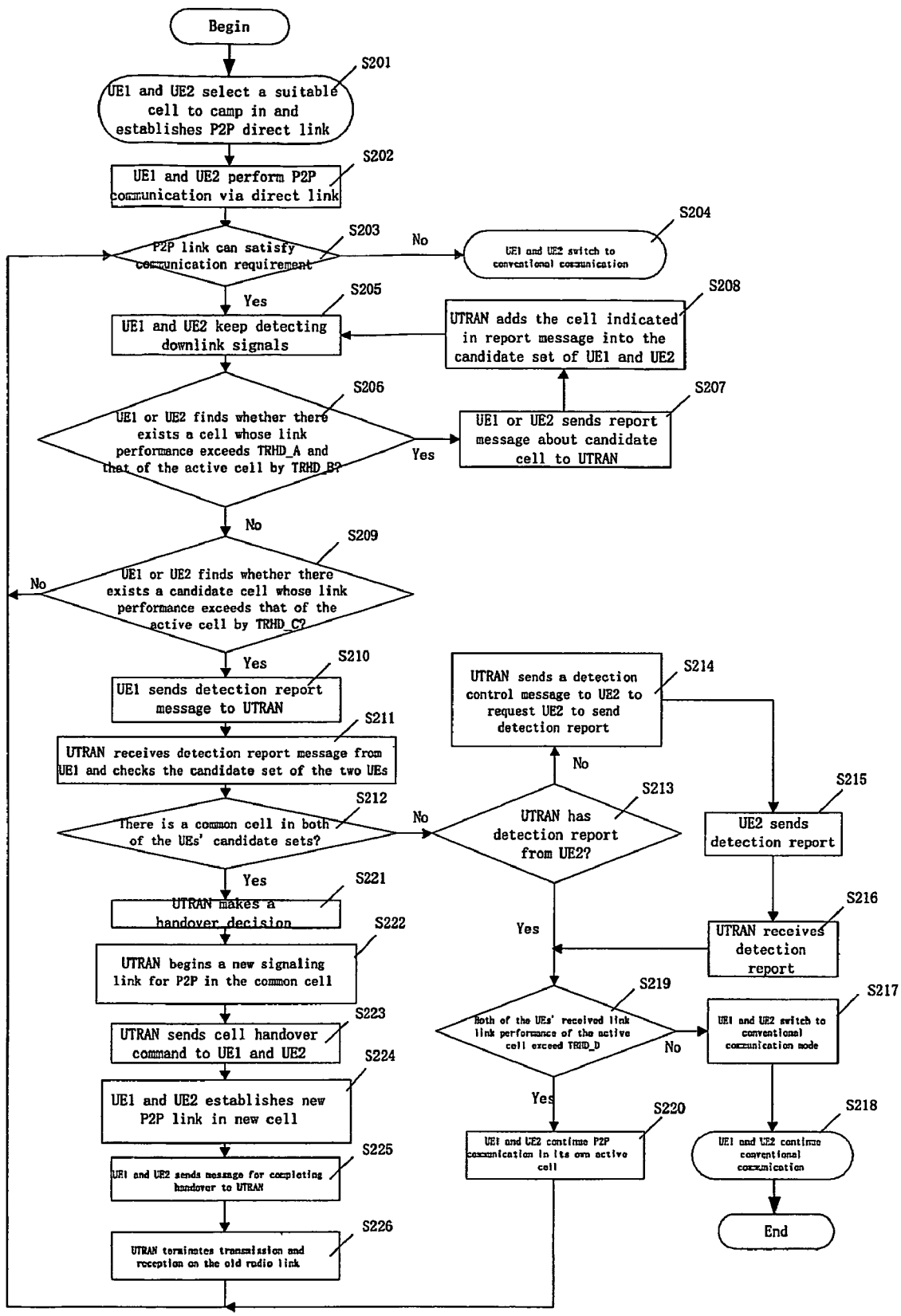
FIG. 4 is a schematic diagram illustrating the cell handover procedure to be executed between the P2P UE and the UTRAN when cell handover is performed by the UE in P2P communication mode.

As FIG. 4 shows, after UE1 and UE2 select their cells to camp in conventional mode, if they satisfy the requirement for P2P communication, UE1 and UE2 can establish P2P direct link with the method as described in the above application document whose application Ser. No. is 03119895.3, or that described in the patent application entitled "A Method and Apparatus for Establishing P2P Communication in Different Cells", filed by KONINKLIJKE PHILIPS ELECTRONICS N.V. along with the present document, with the archive Serial No. as CN030062 (step S201).

After the direct link is established, UE1 and UE2 perform P2P communication through the direct link (step S202).

During P2P communication procedure, UE1 and UE2 keep on measuring whether the P2P link performance can satisfy the QoS requirement (step S203).

When measuring the P2P link performance can't satisfy the QoS requirement, UE1 and UE2 will be switched to communicate in conventional mode, according to the method as described in the above application document whose application Ser. No. is 03123742.8 (step S204).

When measuring the P2P link performance can satisfy the QoS requirement, UE1 and UE2 keep on measuring downlink signals (e.g. RSCP of P-CCPCH) in their respective active cells and adjacent cells, according to the cells indicated in the measurement control message sent by the UTRAN (step S205).

During the measurement, UE1 or UE2 detects whether a suitable cell exists among its adjacent cells, wherein the downlink performance of the suitable cell exceeds a predefined threshold TRHD_A and is a predefined threshold TRHD_B higher than the downlink performance of its current active cell (step S206). Herein, TRHD-A can be the lower limit value at which the communication link satisfies the QoS requirement, while TRHD_B can be a condition in which the adjacent cell can be taken as a candidate cell.

If UE1 or UE2 detects such a suitable cell, UE1 or UE2 sends a candidate cell report message to the UTRAN, so that the suitable cell can be reported to the UTRAN as a candidate cell (step S 207).

After receiving the candidate cell report message from UE1 or UE2, the UTRAN adds the cell indicated in the report message into UE1's or UE2's candidate cell set (step S208).

Herein it's still assumed that the storage area for storing the candidate cell set is large enough, so, whenever UE1 or UE2 finds a new candidate cell and sends a report message to the UTRAN, the UTRAN can add the new candidate cell into UE1's or UE2's candidate cell set.

When UE1 or UE2 measures the downlink of the adjacent cell s indicated in the above measurement control message one by one and still fails to find new candidate cell, UE1 or UE2 detects whether there exists a suitable candidate cell among UE1's or UE2's determined candidate cell set, wherein the link performance of the suitable candidate cell is a predefined threshold TRHD_C higher than that of the current active cell (step S209). TRHD_C is the threshold at which a candidate cell can become the suitable candidate cell.

If such suitable candidate cell exists, UE1 or UE2 sends a measurement report message to the UTRAN to start a judging procedure of the UTRAN, and the judging procedure decides whether UE1 and UE2 can handover to the suitable candidate cell to continue P2P communication (step S210). Wherein the measurement report message includes the link performance of UE1's or UE2's active cell, as well as the link performance measurement result of the suitable candidate cell.

Herein it's assumed that the measurement report message is sent by UE1, the UTRAN will start the handover judging procedure after receiving the measurement report message from UE1. First, the UTRAN checks UE1 and UE2's candidate cell sets (step S211), and determines whether there exists a common candidate cell in the two candidate cell sets (step S212).

If such a common candidate cell exists, the UTRAN makes handover decision according to the radio resource allocation (step S221). If the UTRAN can always satisfy the radio resource requests of UE1 and UE2, the UTRAN activate the link in the common candidate cell for signaling reception and transmission, thus UE1 and UE2 establishes a signaling link with the UTRAN in the common candidate cell (step S222). The UTRAN sends a cell handover command respectively to UE1 and UE2 via the link in the former active cell (step S223). UE1 and UE2 releases P2P link in the former cell after receiving the cell handover command, and establishes a new P2P link in the new common candidate cell according to the radio resource information included in the cell handover command with the method disclosed in above application document whose application Ser. No. is 03119895.3 (step S224). After successfully establishing P2P link in the handover cell, UE1 and UE2 respectively send a handover success message to the UTRAN (step S225). After receiving the handover success message, the UTRAN stops signaling reception and transmission on the link in the former cell and releases the radio resource occupied by the former cell (step S226).

If it's determined that the common candidate cell doesn't exist in above step S212, the UTRAN checks whether it has the measurement report about UE2's link performance in active cell (step S213).

If UE2's measurement report doesn't exist, the UTRAN sends a measurement control message to UE2, for requesting UE2 to report its link performance in its active cell to the UTRAN (step S214). On receipt of the measurement control message, UE2 sends the link performance of its active cell to the UTRAN as a measurement report (step S215). The UTRAN receives the measurement report from UE2 (step S216).

If there exists UE2's measurement report, judge whether the link performance of UE1 and UE2 in the active cells is higher than a predefined threshold TRHD_D (step S219), i.e.: whether UE1 and UE2's link performance in its respective active cell can satisfy the QoS requirement. Wherein TRHD_D is the link quality standard for ensuring signaling transfer between the base station and UE1 and UE2. If UE1 and UE2's link performance in their respective active cells can both satisfy the QoS requirement, the UTRAN sends a P2P communication maintenance command to UE1 and UE2. After UE1 and UE2 receive the P2P communication maintenance command, they continue to maintain the former P2P communication in their respective cells (step S220). If the link performance of at least one of UE1 and UE2 in their active cells can't satisfy the QoS requirement, the UTRAN sends a command for switching to conventional mode to UE1 and UE2. After receiving the command for switching to conventional mode, UE1 and UE2 switch from P2P communication mode to conventional communication mode respectively with the method as disclosed in application document whose application Ser. No. is 03123742.8 (step S217), and continue to communicate in conventional m ode (step S218).

The P2P UE keeps on iterating the above steps from S203 to S226, to better utilize P2P mode to save radio resource when ensuring communication with the other UE ceaselessly.

The cell handover method for P2P UEs as proposed in the present invention, can be implemented in computer software, or hardware modules with software functions, or in combination of software and hardware.

Figure 5:
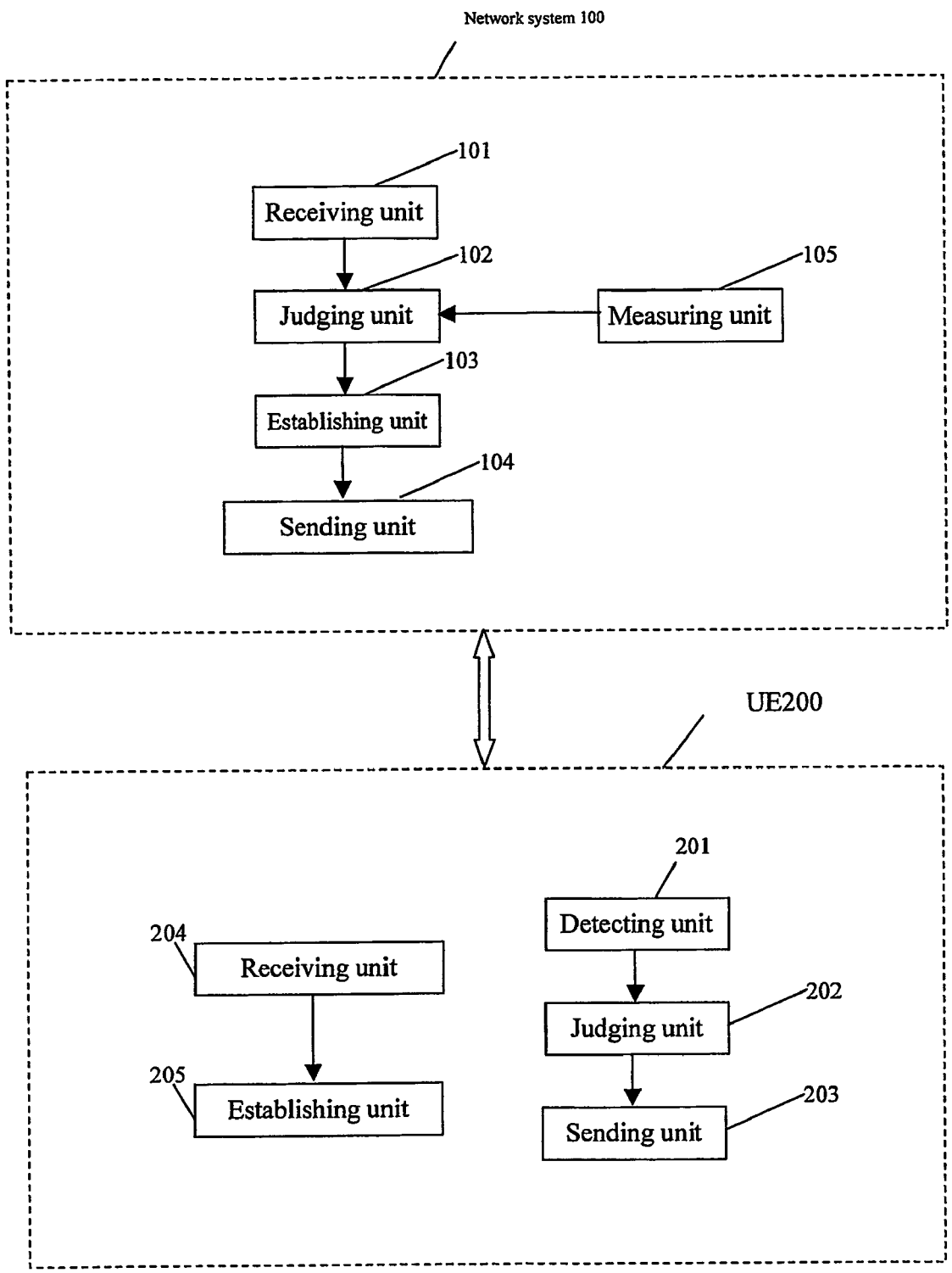
FIG. 5 illustrates the schematic diagram of the components of the network system and the UE in hardware modules, capable of implementing the cell handover method for P2P UEs in accordance with the present invention.

When computer hardware is adopted to implement the cell handover method for P2P UEs as proposed in the present invention, the network system and UE are shown in FIG. 5, wherein the components which are the same as in conventional network systems and UE are not given.

As FIG. 5 shows, detecting unit 201 in UE 200 detects the downlink signals in the UE's active cell and its adjacent cells. According to the measurement result, judging unit 202 judges whether there exists a suitable cell whose link performance is a predefined value higher than that of the active cell. When the suitable cell exist, sending unit 203 sends a measurement report message to network system 100, to start a judging procedure for deciding whether the UE and the other UE in P2P communication can handover to the suitable cell to continue P2P communication.

Receiving unit 101 in network system 100 receives the above measurement report message from any one of the two UEs. According to the measurement report message, judging unit 102 judges whether the link performance of the other UE in the suitable cell satisfies the QoS requirement, to decide whether the two UEs can handover into the suitable cell to continue P2P communication.

If it's judged that the QoS requirement is satisfied, establishing unit 103 establishes signaling link between the two UEs. Sending unit 104 sends a handover command to the two UEs for them to establish P2P link in the suitable cell. When receiving unit 204 in UE 200 receives a handover command from network system 100, it will establish a P2P link with the other UE in the suitable cell.

If it's judged that the QoS requirement is not satisfied, measuring unit 105 in network system 100 checks the link performance of the the other UE in the active cell. Judging unit 102 judges whether the link performance of the two UEs in the active cell can satisfy the QoS requirement. Moreover, when the link performance of the two UEs in the active cell both can satisfy the QoS requirement, the sending unit 104 sends a P2P communication maintenance command to the two UEs for them to continue P2P communication in the active cell. When receiving unit 204 in UE 200 receives a P2P communication maintenance command from network system 100, it will continue P2P communication with the the other UE in the active cell.

Beneficial Results of the Invention

As described above, with regard to the cell handover method for P2P UEs as provided in the present invention, it's to be determined whether there exists a common candidate cell for two P2P communicating UEs when making handover decision. When such common candidate cell exists, the two UEs can handover into the common candidate cell simultaneously. Therefore, after handover into the candidate cell, P2P communication mode can be continued, thus radio resource can be saved when ensuring ceaseless communication between the two UEs.

It is to be understood by those skilled in the art that the method for P2P UEs to handover as disclosed in this invention is not limited herein for TD-SCDMA systems, but also applicable to other TDD wireless systems.

It is to be understood by those skilled in the art that the method for supporting P2P communication to handover as disclosed in this invention can be modified considerably without departing from the spirit and scope of the invention as defined by the appended claims.

What is claimed is:

1. A method to be performed by a UE (user equipment), comprising:

detecting downlink signals of an active cell in which said UE is camping and adjacent cells to said active cell;

judging whether there exists a suitable cell whose link performance is a predefined value higher than that of said active cell for both said UE and an another UE, according to said detecting result;

sending a detection report message to a network system to start a judging procedure of said network system if there exists said suitable cell, and said judging procedure deciding whether said UE and said another UE in P2P (peer to peer) communication can handover into said suitable cell to continue communication in P2P communication mode, wherein said detection report message comprises a first predefined threshold relating to a lower limit value at which a link satisfies a quality of service requirement and a second threshold relating to a condition in which an adjacent cell is used as a candidate cell, and wherein said UE and said another UE each transmits a candidate cell set comprising at least one candidate cell to said network system and said network system determines if a common candidate cell exists in said candidate cell sets, and upon detection of said common candidate cell, said network system instructs said UE and said another UE to perform a handover.

2. The method of claim 1, wherein said judging includes:

judging whether there exist candidate cells whose link performance can meet the requirement for communication quality in said adjacent cells, according to the result of detecting downlink signals;

judging whether there exists said suitable cell in the candidate cells if there exist the candidate cells.

3. The method in claim 2, further comprising:

sending a report message about candidate cells to said network system to report said candidate cells to said network system.

4. The method in claim 1, further comprising:

receiving a cell handover command from said network system;

establishing a P2P connection with said another UE in said suitable cell.

5. The method in claim 4, further comprising:
releasing the P2P connection in said active cell;
sending a message for completing cell handover to said network system.

6. The method in claim 1, further comprising:
receiving a detection control message from said network system;
sending a detection report message about the link performance of said active cell to said network system, according to the detection control message.

7. A method to be performed by a network system, for a first and a second user equipment (UE) in P2P (peer to peer) communication mode to perform cell handover, comprising:
receiving a detection report message from one of said first and second UEs, indicating that said one UE detects there exists a suitable cell in adjacent cells of an active cell, where a link performance of said suitable cell is a predefined value higher than that of said active cell; and
starting a judging procedure to decide whether said first and second UEs can handover into said suitable cell and continue traffic communication between said first and second UE using a P2P communication mode,
wherein said detection report message comprises a first predefined threshold relating to a lower limit value at which a link satisfies a quality of service requirement and a second threshold relating to a condition in which an adjacent cell is used as a candidate cell, and wherein said UE and said another UE each transmits a candidate cell set comprising at least one candidate cell to said network system and said network system determines if a common candidate cell exists in said two candidate cell sets, and upon detection of said common candidate cell, said network system instructs said UE and said another UE to perform a handover.

8. The method in claim 7, further comprising:
judging whether a link performance of another of said first and second UEs can meet a requirement for communication quality in said suitable cell.

9. The method in claim 8, further comprising:
establishing a signaling link between said first and second UEs if the requirement for communication quality is met;
sending a cell handover command to said first and second UEs so that said first and second UEs can establish P2P connection in said suitable cell.

10. The method in claim 8, further comprising:
checking the link performance of said another UE in said active cell if the requirement for communication quality cannot be met;
judging whether the link performance of said first and second UEs in said active cell can meet the requirement for communication quality;
sending a command for maintaining P2P communication to said first and second UEs so that said first and second UEs can continue P2P communication in said active cell if the link performance of said first and second UEs in said active cell both can meet the requirement for communication quality.

11. The method in claim 10, further comprising:
sending a command for switching to conventional communication mode to said first and second UEs so that said first and second UEs can switch to conventional mode from P2P mode if the link performance of at least one of said first and second UEs in said active cell cannot meet the requirement for communication quality.

12. The method in claim 10, wherein step includes:
sending a detection control message to said another UE, to request said another UE to send detection report about the link performance of said active cell;
receiving said detection report from said another UE;
checking the link performance of said another UE in said active cell according to said detection report.

13. The method in claim 7, further comprising:
receiving a report message about the candidate cells to any UE of said first and second UEs, the report message indicating that said one UE detects the link performance of an adjacent cell of said active cell can meet the requirement for communication quality;
marking each candidate cell of said one UE according to the report message.

14. A UE (user equipment), comprising:
a detecting unit, for detecting downlink signals of said UE in an active cell and adjacent cells to the active cell; a judging unit, for judging whether there exists a suitable cell whose link performance is a predefined value higher than that of said active cell, according to the detection result; and
a sending unit, for sending a detection report message to a network system to start a judging procedure of said network system when there exists said suitable cell, wherein said judging procedure decides whether said UE and another UE in P2P (peer to peer) communication can perform a handover into said suitable cell while maintaining communication in P2P communication mode,
wherein said detection report message comprises a first predefined threshold relating to a lower limit value at which a link satisfies a quality of service requirement and a second threshold relating to a condition in which an adjacent cell is used as a candidate cell, and wherein said UE and said another UE each transmits a candidate cell set comprising at least one candidate cell to said network system and said network system determines if a common candidate cell exists in said candidate cell sets, and upon detection of said common candidate cell, said network system instructs said UE and said another UE to perform a handover.

15. The UE in claim 14, further comprising:
a receiving unit, for receiving a cell handover command from said network system;
an establishing unit, for establishing a P2P connection with said another UE in said suitable cell.

16. A network system, comprising:
a receiving unit, for receiving a detection report message from any user equipment (UE) of two UEs, said detection report message indicating that said UE detects there exists a suitable cell in said adjacent cells of an active cell, and a link performance of said suitable cell is a predefined value higher than that of said active cell;
a judging unit, for starting a judging procedure to decide whether said two UEs can simultaneously handover into said suitable cell to continue P2P (peer to peer) communication, wherein said judging unit is for judging whether said link performance of another UE of said two UEs in said suitable cell can meet a requirement for communication quality,
wherein said detection report message comprises a first predefined threshold relating to a lower limit value at which a link satisfies a quality of service requirement and a second threshold relating to a condition in which an adjacent cell is used as a candidate cell, and wherein said UE and said another UE each transmits a candidate cell set comprising at least one candidate cell to said network system and said network system determines if a common candidate cell exists in said two candidate cell sets, and upon detection of said common candidate cell said network system instructs said UE and said another UE to perform a handover.

17. The network system in claim 16, further comprising:
an establishing unit, for establishing signaling link for said two UEs when said judging unit judges that the requirement for communication quality is met;
a sending unit, for sending a cell handover command to said two UEs so that said two UEs can establish P2P connection in said suitable cell.

18. The network system in claim 17, further comprising:
a detecting unit, for checking the link performance of said another UE in said active cell when said judging unit judges that the requirement for communication quality cannot be met,
said judging unit judging whether the link performance of said two UEs in said active cell can meet the requirement for communication quality, and
said sending unit sending a command for maintaining P2P communication to said two UEs so that said two UEs can continue P2P communication in said active cell when the link performance of said two UEs in said active cell both can meet the requirement for communication quality.

19. The network system in claim 17 wherein the sending unit is capable of sending a command to release the P2P connection in said active cell.

20. The network system in claim 19 wherein the sending unit is capable of sending a message for completing cell handover to said network system.

* * * * *